United States Patent [19]

Yagi et al.

[11] Patent Number: 4,766,506
[45] Date of Patent: Aug. 23, 1988

[54] PROCESSING CIRCUIT FOR TELEVISION SYNC SIGNALS PRODUCED FROM A RECORDING MEDIUM FOR PREFORMING A NON-INTERLACED DISPLAY

[75] Inventors: Motoi Yagi, Zushi; Tadao Miyabayashi, Tokyo; Yasuo Morikawa, Fujisawa; Yasuhito Kobayashi, Kawasaki, all of Japan

[73] Assignees: Tokyo Electric Co., Ltd., Nakameguro; Fuji Photo Film Co., Ltd., Minami-ashigara, both of Japan

[21] Appl. No.: 814,617

[22] Filed: Dec. 30, 1985

[30] Foreign Application Priority Data

Jan. 18, 1985 [JP] Japan ................. 60-7060

[51] Int. Cl.⁴ .................. H04N 5/78; H04N 5/04
[52] U.S. Cl. .................. 360/37.1; 360/10.1; 360/35.1; 358/148; 358/909; 358/342
[58] Field of Search ............. 358/148, 160, 906, 909, 358/319, 342; 360/35.1, 37.1, 10.3, 33.1, 10.1

[56] References Cited

U.S. PATENT DOCUMENTS

| | | | |
|---|---|---|---|
| 3,585,291 | 6/1971 | Yamakawa | 360/70 |
| 4,104,684 | 8/1978 | Wakami et al. | 360/70 |
| 4,143,405 | 3/1979 | Kubota | 360/77 |
| 4,229,773 | 10/1980 | Sakamoto | 360/70 |
| 4,268,875 | 5/1981 | Morio et al. | 360/10.3 X |
| 4,542,416 | 9/1985 | Honjo et al. | 360/10.3 |
| 4,613,914 | 9/1986 | Kobori et al. | 360/70 |

Primary Examiner—Robert L. Richardson
Attorney, Agent, or Firm—Frishauf, Holtz, Goodman & Woodward

[57] ABSTRACT

A television synchronizing signal processing circuit includes a reproduction/demodulation circuit for repetitively reading a video signal corresponding to one field from a video signal recording medium and demodulating the video signal and for separating a synchronizing signal from a reproduced/demodulated signal, a first delay circuit for permitting the video signal of the reproduced/demodulated signal which is supplied for every other field from the reproduction/demodulation circuit to be delayed by a time corresponding to one half the period H of a horizontal synchronizing signal, a second delay circuit for delaying a vertical synchronizing signal of the synchronizing signal which is supplied from the reproduction/demodulation circuit, and a waveform synthesizing circuit for synthesizing output signals from the first and second delay circuits to produce a composite video signal. In the processing circuit, the second delay circuit has a variable time TD which is variable within a range of $$0 < TD < H/2.$$

13 Claims, 5 Drawing Sheets

PROCESSING CIRCUIT FOR TELEVISION SYNC SIGNALS PRODUCED FROM A RECORDING MEDIUM FOR PREFORMING A NON-INTERLACED DISPLAY

CROSS REFERENCE TO THE RELATED APPLICATION

A copending U.S. Pat. Application Ser. No. 767,162 entitled "Television Sync Signal Processing Circuit", which was filed on Aug. 19, 1985 (now U.S. Pat. No. 4,675,751, issued June 23, 1987) and assigned to one of the present assignees of this application, discloses the technique of reading a video signal from a disc memory and displaying it on a CRT screen.

BACKGROUND OF THE INVENTION

This invention relates to a television synchronizing signal processing circuit in a still video floppy system, etc., which is used to read a video signal from a disc memory and display it on a CRT screen.

A ½ interlace scanning is adopted in an ordinary TV standard system. In an NTSC system, for example, the horizontal scanning line of one field is 262.5 H (1H: the period of one horizontal synchronizing signal) with 1 frame =2 field =525 H. To reproduce data from a rotation disc of an electronic still camera, which is recorded at a rate of one field (=262.5 H) per rotation, the horizontal synchronizing pulse is displaced by a time 0.5 H (i.e. one half of the horizontal synchronizing pulse) at a junction (a starting point or an ending point) between recording tracks. In this case, an image distortion occurs on the CRT screen in an ordinary TV receiver, making it impossible to provide an accurate image display. It is therefore required to delay reproduced signal read out from the disc for every other field by 0.5 H to obtain a continuous reproduced horizontal sync signal.

If, on the other hand, no delay of 0.5 H is given to the vertical synchronization signal, a standard ½ interlace scanning will be performed. However, the resultant still image has the following drawbacks. Where one scanning line corresponding to a white color is generated between two horizontal scanning lines, each corresponding to a black color or a given scanning line is located at a boundary between the white and black colors, a non-delayed raster and 0.5 H-delayed raster (i.e. a raster vertically displaced by a spacing corresponding to one scanning line) are alternately displayed for each field and the display raster is moved up and down for each field by a spacing corresponding to one scanning line, resulting in an unstable still image.

In order to eliminate the drawback, the phase of the vertical synchronizing signal has to be controlled, without performing the ½ interlace so that the aforementioned rasters assume substantially the same positions for every field.

SUMMARY OF THE INVENTION

It is accordingly the object of this invention to provide a television synchronizing signal processing circuit which permits a composite video signal which is used for performing an image display in accordance with a ½ interlace scanning system to be prepared through the repetitive reading of a video signal of one field from an image signal recording medium, thereby effectively suppressing variations of the vertical position of horizontal scanning lines on a display screen.

The object of this invention can be implemented by a television synchronizing signal processing circuit comprising a reproduction/demodulation circuit for repetitively reading a video signal of one field from a video signal recording medium and producing an output signal as a demodulated signal and for permitting a separation of a synchronizing signal from a reproduced/demodulated signal to deliver it;

a first delay circuit for permitting the video signal of the reproduced/demodulated signal which is supplied for every other field from the reproduction/demodulation circuit to be delayed by one half the period of a horizontal synchronizing signal;

a second delay circuit for permitting a vertical synchronizing signal of the synchronizing signal which is supplied from the reproduction/demodulation circuit to be delayed by a delay time which can be variably set within a range shorter than one half the period of the horizontal synchronizing signal; and a waveform synthesizing circuit for synthesizing outputs of the first and second delay circuits to produce a composite video signal.

According to this invention a reproduced/demodulated signal of a synchronizing signal is delayed by the first delay circuit by one half the period H of a horizontal synchronizing signal. A vertical synchronizing signal of the synchronizing signal which is separated from the reproduced/demodulated signal is delayed by a delay time TD which can be variably set within a range of 0<TD <H/2. A composite video signal is provided which includes the vertical synchronizing signal and the horizontal synchronizing signal which is delayed H/2 behind the horizontal synchronizing signal of the reproduced signal read out from the recording medium. According to this invention it is possible to reduce or eliminate an undesirable positional shift between the horizontal scanning lines corresponding to the horizontal signal in the non-delayed field and the horizontal scanning lines corresponding to the horizontal scanning signal in the delayed field.

DETAILED DESCRIPTION OF THE PREFERRED EMBODIMENT

The process leading to this invention will be explained below with reference to FIGS. 1A to 1E jointly. In these Figures, for brevity in explanation, the length of one field is set to be approximately 4.5 times the period H of a horizontal synchronizing signal with a vertical synchronizing pulse shown narrowed.

Figures 1A, 1B:
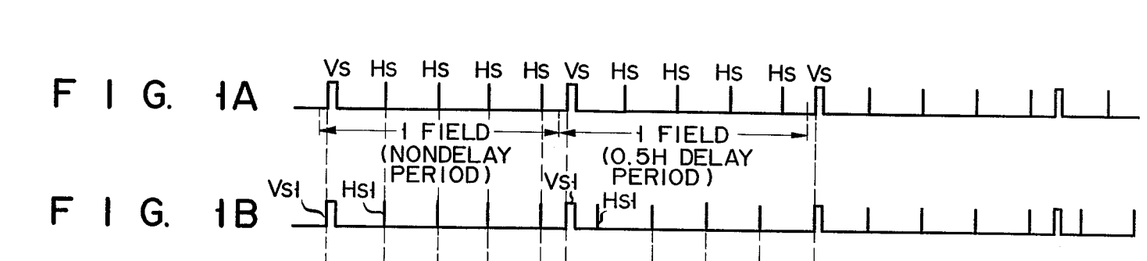
FIGS. 1A to 1E show a signal waveform diagram for explaining a process leading to this invention.

FIG. 1A shows a synchronizing pulse for a reproduction signal with vertical and horizontal synchronizing signals represented by Vs and Hs, respectively, noting that the pulse width of the vertical synchronizing signal is shown narrowed. With the vertical synchronizing pulse Vs not delayed and the horizontal synchronizing pulse Hs delayed by 0.5 H it is possible to obtain a synchronizing pulse as shown in FIG. 1B. The vertical scanning waveform derived from a vertical synchronizing pulse Vs1 of the aforementioned synchronizing signal becomes a waveform A as indicated by a dash-dot line in FIG. 1E. At this time, the horizontal scanning line corresponding to the horizontal synchronizing pulse occupies a position indicated by a in FIG. 1E during the non-delay period, but occupies a position indicated by b in FIG. 1E during the delay period, i.e., a position shifted downward relative to the position a. The adoption of such a system causes an image to move up and down for each field.

Figure 1C:
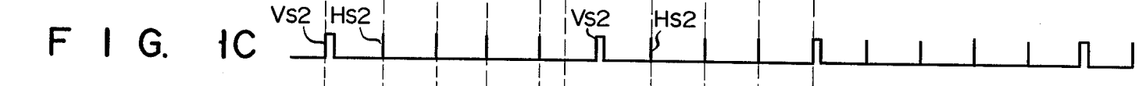

From this it may be considered that, for example, a delay of 0.5 H is given to both the vertical synchronizing pulse Vs and horizontal synchronizing pulse Hs for every other field. In this case, it is possible to obtain a synchronizing pulse as shown in FIG. 1C. A vertical synchronizing waveform derived from the vertical synchronizing pulse Vs2 of the aforementioned synchronizing pulse becomes a waveform B as indicated by a broken line in FIG. 1E. At this time, the scanning line corresponding to the horizontal synchronizing pulse occupies a position as indicated by a in FIG. 1E during the nondelay period, but occupies a position as indicated by c in FIG. 1E during the delay period, i.e., a position shifted upward relative to the position indicated by a in FIG. 1E. Even in this system the image oscillates, as in the aforementioned system, up and down for each field.

Figure 1D:
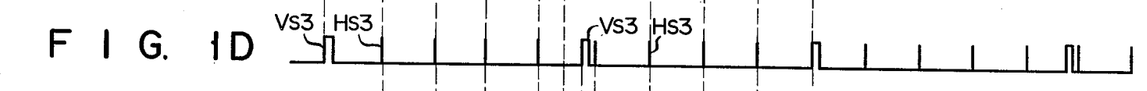

The inventors have found, as described in the above-mentioned U.S. Pat. No. 4,675,751, that with a delay of 0.5 H given to the horizontal synchronizing pulse and a delay of 0.25 H given to the vertical synchronizing pulse it is possible to obtain a synchronizing pulse as shown in FIG. 1D and that from the vertical synchronizing pulse Vs3 of the aforementioned synchronizing pulse it is possible to obtain a vertical synchronizing waveform as indicated by c (a solid line) in FIG. 1E. At this time, the scanning line corresponding to the horizontal synchronizing pulse occupies a position as indicated by a in FIG. 1E during the nondelay period, but occupies a position as indicated by d in FIG. 1E during the delay period. From this it is found that the position of the point a is substantially in agreement with that of the point d. That is, it is found that a static image free from up/down oscillation is obtained by processing the synchronizing pulse in the aforementioned way. This is the case of a standard TV receiver. In actual practice, however, the optimal delay time of the vertical synchronizing signal is not necessarily 0.25 H and varies depending upon the type and manufacturer of that receiver. The inventors have found it helpful to variably adjust the delay time for the vertical synchronizing pulse within a given range. In this connection various experiments have been made and it has been found that, if a delay time TD for the vertical synchronizing pulse can be adjusted within a range of $0 < TD < 0.5$ H during the delay period, it is possible to adequately eliminate a variation in an optimal delay time for the vertical synchronizing signal due to a variation in type and manufacturer of the TV receiver.

Figure 2:
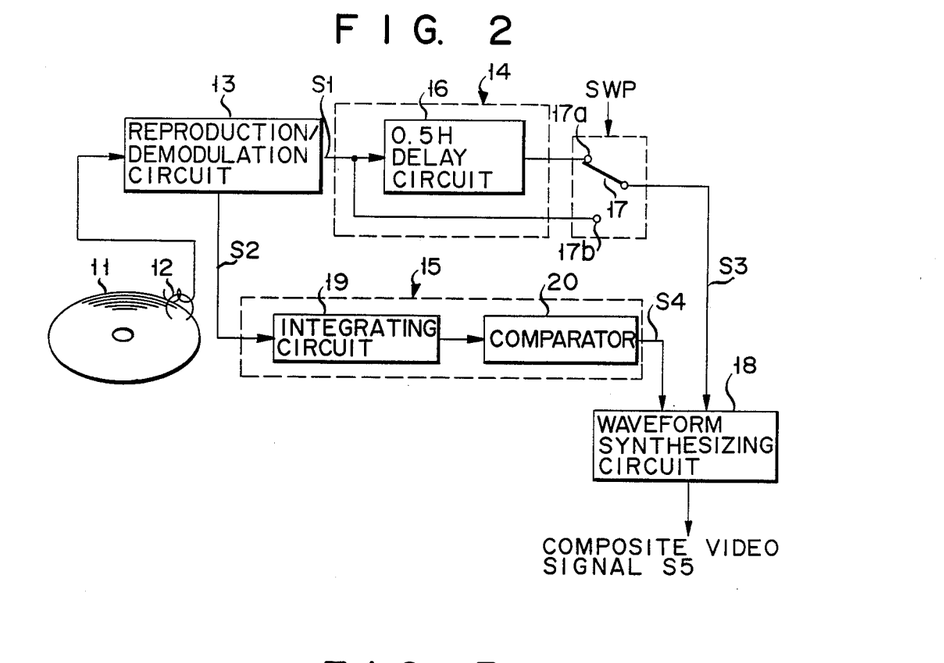
FIG. 2 is a block diagram showing a television synchronizing signal processing circuit according to a first embodiment of this invention.

FIG. 2 shows a television synchronizing signal processing circuit according to one embodiment of this invention which repetitively reads out a composite video signal corresponding to one field from magnetic disc 11 and provides a composite video signal on the basis of the aforementioned readout composite video signal so as to permit it to be displayed on a TV screen. Magnetic disc 11 is a video signal storage medium for storing a plurality of video signals at a rate of one field per rotation which is necessary to form a composite video signal for displaying a one-frame image in accordance with a ½-interlace scanning system. For example, magnetic disc 11 includes a plurality of tracks each recorded with the composite video signal of one field. A TV video signal is formed by repetitively reading out the one-field video signal. Magnetic head 12 repetitively reads out from magnetic head 12 at a rate of, for example, 60 times per second the composite video signal of one field which is stored in disc 11. The composite video signal so read out is supplied to reproduction/demodulation circuit 13. Reproduction/demodulation circuit 13 supplies a reproduced/demodulated signal S1 input from the head to first delay circuit 14 and a synchronizing signal S2, i.e. an inverted replica of a synchronizing signal separated from the reproduced/demodulated signal, to second delay circuit 15. First delay circuit 14 is comprised of two-contact changeover switch 17 and 0.5 H delay circuit 16 for delaying an input signal by one half the period H of the horizontal synchronizing signal. The reproduced/demodulated signal S1 from reproduction/demodulation circuit 13 is supplied to contact 17a of changeover switch 17 through 0.5H delay circuit 16 and directly to another contact 17b of changeover switch 17. Changeover switch 17 permits contacts 17a, 17b to be selectively set in accordance with a switching pulse SWP which alternately goes high or low for every field. In this way, the reproduction signal which has been input to contact 17a or 17b is supplied as a delayed reproduction signal S3 to waveform synthesizing circuit 18.

Second delay circuit 15 is comprised of, for example, single-polarity integrating circuit 19 and comparator 20. Second delay circuit 15 permits a synchronizing signal input to integrating circuit 19 therein to be integrated with a greater time constant in response to its leading edge or rise thereof and with a smaller time constant in response to its trailing edge or fall. Comparator 20 compares an input signal from integrating circuit 19 with a predetermined level and produces a square wave signal S4 which goes high when an input signal is below the predetermined level. The square wave signal S4 from comparator S4 is supplied to waveform synthesizing circuit 18.

The waveform synthesizing circuit 18 permits the reproduction signal S3 from changeover switch 17 to pass therethrough when the square wave signal S4 from comparator 20 is at a low level, and produces a low level signal, irrespective of the reproduction signal S3 from changeover switch 17, when the square wave signal S4 from comparator 20 is at a high level. Waveform synthesizing circuit 18 produces an output signal as a composite video signal S5 for display on the CRT screen.

Figure 3:
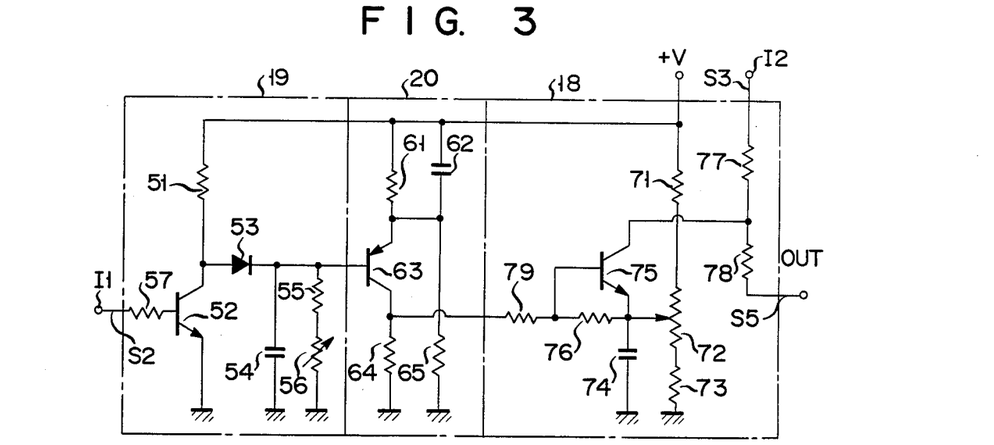
FIG. 3 is a circuit diagram showing a major section of the television signal processing circuit shown in FIG. 2.

Single-polarity integrating circuit 19, comparator 20 and waveform synthesizing circuit 18 are shown in more detail in FIG. 3. In integrating circuit 19 NPN type transistor 52 is connected between a +V terminal and ground through resistor 51 and the collector of transistor 52 is connected to charging/discharging capacitor 54 through forward diode 53 and to a series circuit of resistor 55 and variable resistor 56. The resistive value of resistor 51 is set to be adequately smaller than a resultant resistive value of resistor 55 and variable resistor 56, and the charging circuit comprised of resistor 51, diode 53 and capacitor 54 has a charging time constant set to be adequately smaller than the discharging time of the discharging circuit comprised of capacitor 54, resistor 55 and variable resistor 56. The synchronizing signal S2 is supplied from an input terminal I1 through resistor 57 to the base of transistor 52.

Comparator 20 is comprised of a parallel circuit of resistor 61 and capacitor 62 and series circuit of PNP transistor 63 and resistor 64 connected between the +V terminal and ground, and one end of resistor 61 or the emitter of transistor 63 is grounded through resistor 65. The base of transistor 63 is connected to a junction between diode 53 and capacitor 54 in integrating circuit 19.

In waveform synthesizing circuit 18, a series circuit of resistor 71, variable resistor 72 and resistor 73 is connected between the +V terminal and ground; capacitor 74 is connected in parallel with the series circuit of a tap of variable resistor 72 and resistor 73; NPN type transistor 75 has its emitter connected to the tap of variable resistor 72, its base-to-emitter path connected to resistor 76 and its collector connected to a junction between resistors 77 and 78; resistor 77 is connected at the other end to an input terminal I2 supplied with the reproduced signal S3; resistor 78 is connected at the other end to an output terminal OUT for the composite video signal S5; and the collector of transistor 63 in comparator 20 is connected through resistor 79 to the base of transistor 79.

Figure 4:
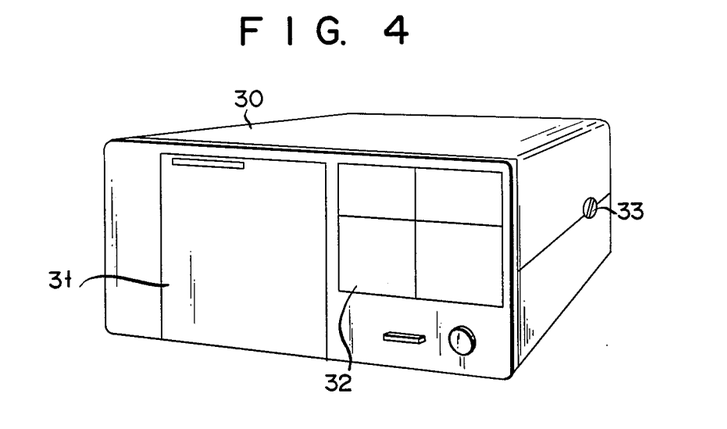
FIG. 4 is an outer configuration of a TV signal processing apparatus incorporating the circuit of FIG. 2 therein.

The television signal processing circuit as explained in connection with FIGS. 2 and 3 is housed in casing 30 as shown in FIG. 4. Holder 31 for holding magnetic disc 11 and operation section 32 for operating the television signal processing circuit are provided at the front section of casing 30 and an operation knob 33 is provided at the right side surface of casing 30 to adjust the value of variable resistor 56 in integrating circuit 19.

The operation of the television synchronizing signal processing circuit will be explained below with respect to FIGS. 5A to 5G.

Figure 5A:
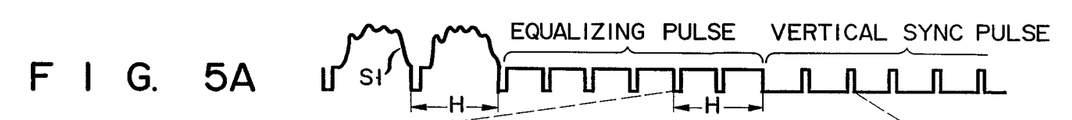
FIGS. 5A to 5G show signal waveform diagrams for explaining the operation of the signal processing circuit shown in FIGS. 2 and 3.
Figure 5B:
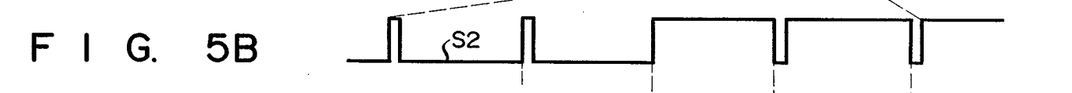

Reproduction/demodulation circuit 13 receives a reproduction signal from magnetic head 12 and produces a reproduced/demodulated signal S1 as shown in FIG. 5A and a synchronizing signal S2 as shown in FIG. 5B, noting that the portions of equalizing pulse and vertical synchronizing pulse in the reproduced/demodulated pulse S1, that is, only those areas of these pulses as indicated by a dash line in FIGS. 5A and 5B are shown enlarged. Transistor 52 is turned ON when integrating circuit 19 receives the synchronizing signal S2 of a high level and is turned OFF when integrating circuit 19 receives the synchronizing signal S2 of a low level. With transistor 52 in the OFF state capacitor 54 is charged at a relatively rapid speed through resistor 51 and diode 53 and with transistor 52 in the ON state capacitor 54 is discharged at a relatively slow speed through resistor 55 and variable resistor 56. A voltage across capacitor 54 varies as shown in FIG. 5D. That is, since during the equalizing pulse supply period transistor 52 is turned ON for a short time, capacitor 54 is little discharged and a potential across capacitor 54 is retained substantially at the +E1 level. On the other hand, during the vertical synchronizing pulse supply period transistor 52 is turned ON for a relatively long period and, therefore, capacitor 54 is discharged through resistor 55 and variable resistor 56, resulting in a potential drop across capacitor 54. A potential across capacitor 54 is lowered to a level +E0, that is, a level at which transistor 63 is turned ON, and then transistor 63 is turned ON. Comparator 20 utilizes the level +E0 as a reference level. When the delay time TD is set to, for example, TDX with the discharge time constant of integrating circuit 19 and reference level E0 of comparator 20, transistor 63 is turned ON a time period TDX after capacitor 54 begins to discharge.

When operation knob 33 is externally operated to vary or adjust the resistive value of variable resistor 56, then the discharging time constant varies. If the resistive value of variable resistor 56 varies to have, for example, a greater resistive value, a potential across capacitor 54 varies as indicated by a dash line in FIG. 5D and thus the time period from the start of charging of capacitor 54 to the turning ON of transistor 63 varies from TDX to TDL (>TDX). Variable resistor 56 is so set as to vary within a range of 0<TD<0.5 H.

Thereafter, when transistor 52 is turned OFF, capacitor 54 is immediately charged at a rapid speed. During the time period in which transistor 63 is turned ON, the collector voltage of transistor 63 goes high and thus comparator 20 delivers the square wave signal S4 as shown in FIG. 5E.

Figure 1E:
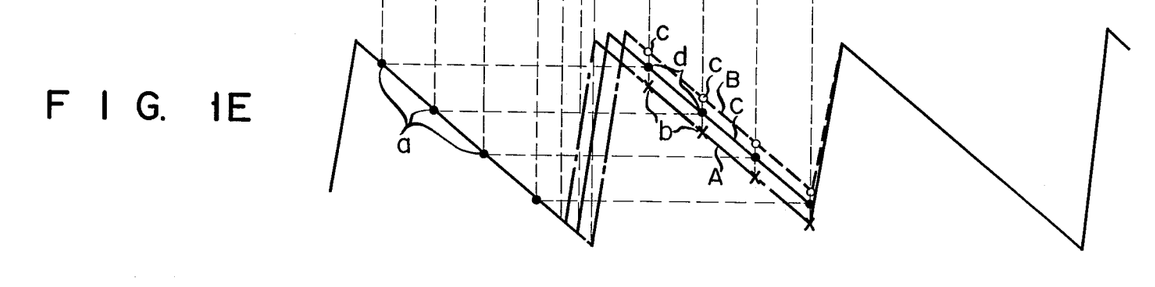

On the other hand, the reproduction signal S3 which has been sent from reproduction/demodulation circuit 13 through 0.5 H delay circuit 16 is delayed 0.5 H (i.e. one half the period of the horizontal synchronizing signal) behind the reproduced/demodulated signal S1 from reproduction/demodulation circuit 13. However, the composite video signal S5, an output from waveform synthesizing circuit 18, becomes a waveform delayed by the time TD (0<TD<0.5 H) at the time of a change from the equalizing pulse to the vertical synchronizing pulse as shown in FIG. 5G. When the output signal from the reproduction/demodulation circuit 13 is supplied to waveform synthesizing circuit 18 through delay circuit 16 it passes through waveform synthesizing circuit 18 without being influenced by the output signal of comparator 20.

Where the reproduced/demodulated signal is delayed by the time 0.5 H through 0.5 H delay circuit 16 the vertical synchronizing pulse is delayed by the variable time TD within the range of 0<TD<0.5 H by the operation of the operation knob 33. Thus, the horizontal synchronizing pulse is delayed by the time 0.5 H, while on the other hand the vertical synchronizing pulse is delayed by the variable time TD. Now suppose that use is made of a variety of TV receivers where the optimal delay time of the vertical synchronizing pulse varies slightly. Even in this case, through the operation of operation knob 33 the delay time of the vertical synchronizing pulse can be readily adjusted so that the horizontal synchronizing pulse takes an optimal phase where a matching occurs between the scanning line corresponding to the horizontal synchronizing pulse during the nondelay time and the scanning line corresponding to the horizontal synchronizing pulse during the delay time without being oscillated in the up/down direction as shown in FIG. 1E. The signal processing circuit of this invention can generally be applied to any type of TV receiver with the positions of the scanning lines in the respective field so matched. Since the delay time of the vertical synchronizing pulse is determined by varying the discharging time constant of the capacitor 54 via variable resistor 56, there is no possibility that the amplitude of the output of comparator 20, i.e., output pulse at the collector of transistor 63, will vary due to variable resistor 56. It is, therefore, possible to stably operate waveform synthesizing circuit 18 at a subsequent stage.

In consequence, even if the signal processing circuit of this invention is connected to one of various home TV receivers to display a still image recorded on magnetic disc 11, it is possible to display a sharp still image free from any up/down oscillation.

According to this invention a simpler circuit arrangement is obtained because the delay circuit for delaying the vertical synchronizing pulse by the time TD (0<TD<0.5 H) is comprised of single-polarity integrating circuit 19 and comparator 20. Furthermore, since the horizontal synchronizing pulse Hs can be contained in the vertical synchronizing signal as indicated by Hs in FIG. 5G, there is a possibility that an up/down oscillation suppression effect will fluctuate due to the scanning circuit of a TV monitor as compared with a counterpart which involves the horizontal pulse.

The other embodiment of this invention will be explained below with respect to FIGS. 6 et seq. in which identical reference numerals are employed to designate parts or elements corresponding to those shown in the earlier embodiment.

Figure 6:
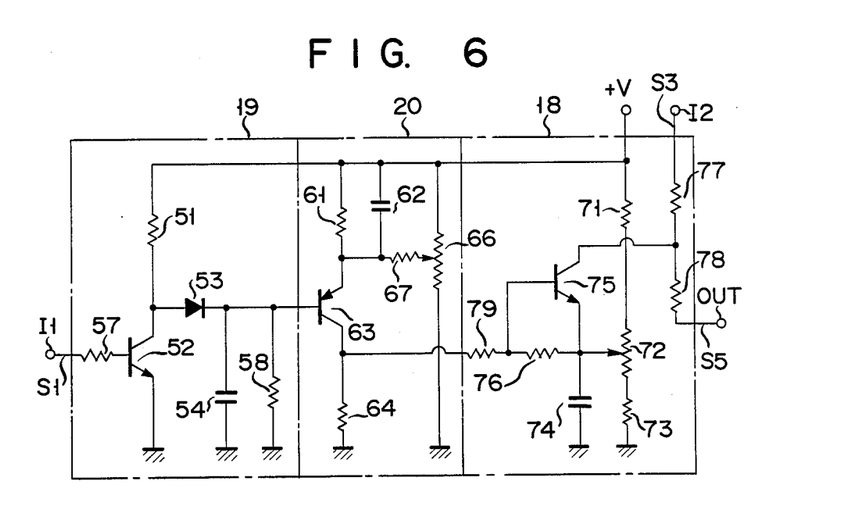
FIGS. 6 and 7 each show a modification of the signal processing circuit shown in FIG. 3.

In this embodiment, resistor 58 replaces resistor 55 and variable resistor 56 in the single-polarity integrating circuit 19 in FIG. 6, thereby making the discharging time constant fixed. A variable resistor or potentiometer 66 is connected between a +V terminal and ground in place of resistor 65 in comparator 65 and the emitter of transistor 63 is connected through resistor 67 to a tap on variable resistor 66. In this case, variable resistor 66 can be externally operated by operation knob 33 as in the case of variable resistor 56. It is to be noted that waveform synthesizing circuit 18 is so configured as in the case of the abovementioned embodiment.

In this embodiment the ON level +E (See FIG. 5D) of second transistor 63 can be varied by operating variable resistor 66 in a variable fashion. Furthermore, the delay time TD from the start of discharging of capacitor 54 to the turning on of transistor 63 can be varied by operating variable resistor 66 in a variable fashion. Even in this case, the time TD can be varied within the range of 0<TD<0.5 H.

This invention can equally be applied to this embodiment with the same effect as in the earlier embodiment.

Figure 5C:
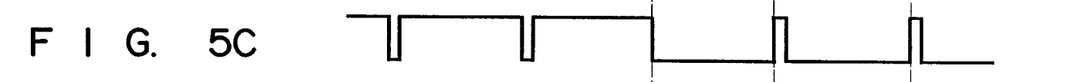
Figure 5D:
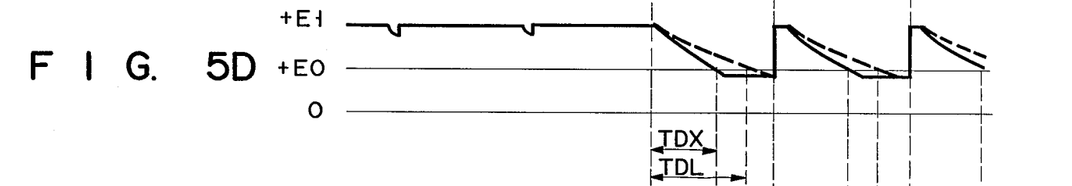
Figure 5E:
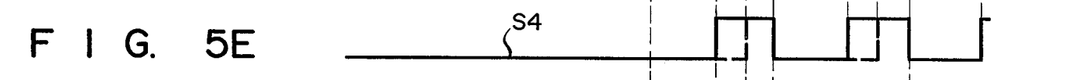
Figures 5F, 5G:
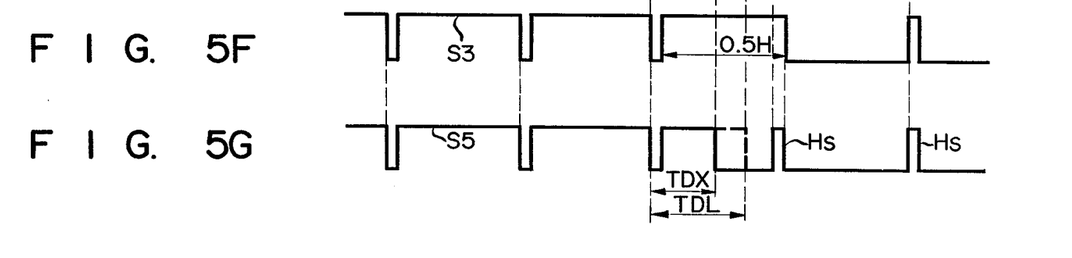
Figure 7:
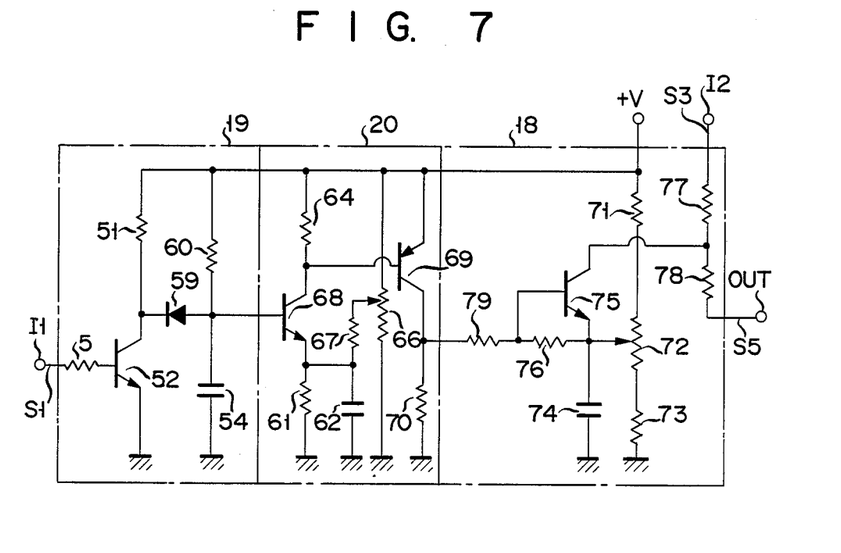

FIG. 7 shows a modification of delay circuit 15 which can be used in a case where a synchronizing signal derived from reproduction/demodulation circuit 13 has a polarity opposite to that of signal S2, or synchronizing signal shown in FIG. 5C is supplied thereto. In this case, a reverse diode as opposed to a forward diode is used in place of diode 53 in single-polarity integrating circuit 19, and resistor 60 is connected between a +V terminal and a junction of capacitor 54 and diode 59 in place of the aforementioned series circuit of resistor 55 and variable resistor 56. NPN type transistor 68 is used in place of transistor 63 in comparator 20; on terminal of a parallel circuit of resistor 61 and capacitor 62 is connected to ground in place of being connected to a +V terminal; one terminal of resistor 64 is connected to the +V terminal in place of being connected to ground; and the emitter of transistor 68 is connected through resistor 67 to a tap on variable resistor or potentiometer 66. A series circuit of PNP type transistor 69 and resistor 70 is connected between the +V terminal and ground. Transistor 69 is connected at its base to the collector of transistor 68 and the collector of transistor 69 is connected to an output terminal.

With transistor 52 in the OFF state, capacitor 54 is charged through resistor 60 and, when a charging voltage on capacitor 54 reaches a predetermined level, transistor 68 is turned ON. With transistor 68 in the ON state, transistor 69 is turned ON and a high level signal S4 is delivered as an output from the collector of transistor 69. When transistor 52 is turned ON, capacitor 54 is rapidly discharged through diode 59 and transistor 52.

In consequence, the circuit shown in FIG. 7 is used when a synchronizing signal S2 input to the input terminal Il is opposite in polarity to the synchronizing signal used in the embodiment shown in FIGS. 3 and 6, noting that the same advantage is also obtained in this circuit as in the case of the circuit shown in FIGS. 3 and 6.

Although this invention has been explained in connection with the aforementioned embodiments, it is not restricted thereto.

While in the aforementioned embodiment the magnetic disc is used as a video signal recording medium, this invention is not restricted thereto. According to this invention it is possible to use, for example, an optical disc or a disc with an indented surface.

While in the aforementioned embodiment the single-polarity integrating circuit and comparator are used as second delay circuit 15, this invention is not restricted to the aforementioned embodiments.

What is claimed is:

1. A television synchronizing signal processing circuit, comprising:
    a reproduction and demodulation circuit means for reproducing a video signal by repeatedly reading out a video signal for one field from a video signal recording medium upon which is stored a video signal of a plurality of fields in accordance with a one-half scanning system, and for generating said reproduced video signal and a synchronizing signal separated from said reproduced video signal;
    a first delay means coupled to said reproduction and demodulation circuit means for delaying said reproduced video signal read out for every other field by one half of a period (H) of the horizontal synchronizing signal, said first delay means transmitting said reproduced video signal read out for the remaining field without any delay;
    a second delay means coupled to said reproduction and demodulation circuit means for delaying a vertical synchronizing signal included in said separated synchronizing signal and having a variable delay time (TD) of 0<TD<H/2 within which a vertical synchronizing signal from said reproduction and demodulation circuit can be delayed; and
    a waveform synthesizing circuit means for combining the outputs of said first and second delay means to produce a composite video signal used for performing substantially non-interlaced display.

2. A television synchronizing signal processing circuit according to claim 1, in which said second delay means comprises:
    a single-polarity integrating circuit means responsive to a leading edge of said vertical synchronizing signal of said synchronizing signal from said reproduction and demodulation circuit to integrate said synchronizing signal in accordance with a time constant which is selectively variably adjusted, and a comparator means for comparing the output signal from said single-polarity integrating circuit means with a predetermined value and for permitting an output signal, which is supplied from the single-polarity integrating circuit means when it reaches said predetermined value, to vary from a first level to a second level, in which said waveform synthesizing circuit means permits an output signal from said first delay means to pass therethrough when an output signal from the comparator means is at the first level and permits an output signal of a reference level to be produced when an output signal from said comparator means is at the second level.

3. A television synchronizing signal processing circuit according to claim 2, in which said single-polarity integrating circuit means comprises:

a capacitor;

a discharge path means for discharging the capacitor with a discharging time constant which is selectively variably adjusted; and a charging path means for charging said capacitor with a charging time constant smaller than that of the discharging path means.

4. A television synchronizing signal processing circuit according to claim 3, in which said discharge path means includes a variable resistor connected in series with said capacitor and having externally operable control terminal.

5. A television synchronizing signal processing circuit according to claim 1, in which said second delay means comprises a single-polarity integrating circuit means responsive to a leading edge of a vertical synchronizing signal of said synchronizing signal from said reproduction and demodulation circuit to integrate said synchronizing signal, and a comparator means for comparing an output signal from said single-polarity integrating circuit means with a predetermined value which can be set to be variable externally and for permitting an output signal supplied from the single-polarity integrating circuit means when it reaches said predetermined value to vary from a first level to a second level, in which said waveform synthesizing circuit means permits an output signal from said first delay means to pass therethrough when the output signal from said comparator means is at the first level and permits an output signal of a reference level to be delivered when the output signal from said comparator means is at the second level.

6. A television synchronizing signal processing circuit according to claim 5, in which said single-polarity integrating circuit means comprises:

a capacitor;

a discharge path means for discharging the capacitor with a predetermined discharging time constant; and a charging path means for charging the capacitor with a charging time constant smaller than the discharge time constant.

7. A television synchronizing signal processing circuit according to claim 6, in which said comparison circuit comprises:

a voltage generator having a control terminal which is externally operable to permit a variable predetermined voltage to be generated; and a comparator for comparing an output signal from the single-polarity integrating circuit with the variable predetermined voltage from said voltage generator.

8. A television synchronizing signal processing circuit according to claim 7, in which said voltage generator includes a potentiometer having a variable terminal externally operable and connected to said comparison circuit means.

9. A television synchronizing signal processing circuit according to claim 5, in which said comparator means comprises:

a voltage generator having a control terminal which is externally operable to permit a variable predetermined voltage to be generated; and a comparator for comparison circuit means an output signal from the single-polarity integrating circuit means with the variable predetermined voltage from said voltage generator.

10. A television synchronizing signal processing circuit according to claim 9, in which said voltage generator includes a potentiometer having a variable, terminal externally operable and connected to said comparison circuit means.

11. A television synchronizing signal processing circuit according to claim 2, in which said single-polarity integrating circuit means comprises:

a capacitor;

a discharging circuit means for discharging the capacitor with a predetermined time constant; and a charging circuit means for charging said capacitor with a charging time constant greater than said discharging time constant.

12. A television synchronizing signal processing circuit according to claim 11, in which said comparator means comprises:

a voltage generator having a control terminal which is externally operable to permit a variable predetermined voltage to be generated; and a comparison circuit means for comparing an output signal from the single-polarity integrating circuit means with the variable predetermined voltage from said voltage generator.

13. A television synchronizing signal processing circuit according to claim 6, in which said comparison circuit comprises:

a voltage generator having a control terminal which is externally operable to permit a variable predetermined voltage to be generated; and a comparator for comparing an output signal from the single polarity integrating circuit with the variable predetermined voltage from said voltage generator.

* * * * *

UNITED STATES PATENT AND TRADEMARK OFFICE
CERTIFICATE OF CORRECTION

PATENT NO. : 4,766,506

DATED : Aug. 23, 1988

INVENTOR(S) : YAGI et al

It is certified that error appears in the above-identified patent and that said Letters Patent is hereby corrected as shown below:

Title page, under U.S. Patent Documents, delete

```
"3,585,291    6/1971    Yamakawa.........360/70
 4,104,684    8/1978    Wakami et al.....360/70
 4,143,405    3/1979    Kubota...........360/77
 4,229,773   10/1980    Sakamoto.........360/70
 4,613,914    9/1986    Kobori et al.....360/70"
```

Signed and Sealed this

Twenty-sixth Day of December, 1989

Attest:

JEFFREY M. SAMUELS

*Attesting Officer*    *Acting Commissioner of Patents and Trademarks*